United States Patent
Katagawa

(10) Patent No.: US 10,334,176 B2
(45) Date of Patent: Jun. 25, 2019

(54) IMAGING APPARATUS

(71) Applicant: CANON KABUSHIKI KAISHA, Tokyo (JP)

(72) Inventor: Hiroyasu Katagawa, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 57 days.

(21) Appl. No.: 15/599,150

(22) Filed: May 18, 2017

(65) Prior Publication Data

US 2017/0353648 A1 Dec. 7, 2017

(30) Foreign Application Priority Data

Jun. 1, 2016 (JP) .................. 2016-110350

(51) Int. Cl.
| | | |
|---|---|---|
| H04N 5/235 | (2006.01) | |
| H04N 5/225 | (2006.01) | |
| H04N 5/232 | (2006.01) | |
| H04N 5/265 | (2006.01) | |
| H04N 7/01 | (2006.01) | |
| H04N 9/04 | (2006.01) | |
| H04N 9/69 | (2006.01) | |
| H04N 5/355 | (2011.01) | |
| H04N 5/369 | (2011.01) | |

(52) U.S. Cl.
CPC ......... *H04N 5/2352* (2013.01); *H04N 5/2251* (2013.01); *H04N 5/2355* (2013.01); *H04N 5/23212* (2013.01); *H04N 5/23293* (2013.01); *H04N 5/265* (2013.01); *H04N 5/35554* (2013.01); *H04N 5/3696* (2013.01); *H04N 7/0127* (2013.01); *H04N 9/045* (2013.01); *H04N 9/69* (2013.01)

(58) Field of Classification Search
None
See application file for complete search history.

(56) References Cited

U.S. PATENT DOCUMENTS

| | | | | |
|---|---|---|---|---|
| 2014/0204241 | A1* | 7/2014 | Ohara | H04N 5/23212 348/223.1 |
| 2016/0286108 | A1* | 9/2016 | Fettig | H04N 5/2355 |
| 2017/0099449 | A1* | 4/2017 | Kang | H04N 5/3765 |
| 2017/0359539 | A1* | 12/2017 | Kawabata | G02B 7/34 |
| 2018/0041724 | A1* | 2/2018 | Kim | H04N 5/235 |

FOREIGN PATENT DOCUMENTS

| | | |
|---|---|---|
| JP | 2000-50151 A | 2/2000 |
| JP | 2008-134389 A | 6/2008 |

* cited by examiner

*Primary Examiner* — James M Hannett
(74) *Attorney, Agent, or Firm* — Canon U.S.A., Inc. IP Division

(57) ABSTRACT

An imaging apparatus according to the present invention includes an imaging unit configured to capture an image of an arbitrary object and output a plurality of image signals with different exposures and a focus detection signal, and a composition unit configured to compose the plurality of image signals with different exposures output from the imaging unit and output the composed image signal. In a case of time-sequentially capturing images in succession, the imaging unit outputs the focus detection signal instead of the plurality of image signals at a predetermined timing. The composition unit composes image signals by using image signals in a time-sequentially adjacent different timing instead of image signals missing at the predetermined timing.

20 Claims, 12 Drawing Sheets

FIG. 9A
WITH FULLHD30P

| PUPIL-DIVISION IMAGE (A IMAGE) | PUPIL-DIVISION IMAGE (A IMAGE) | PUPIL-DIVISION IMAGE (A IMAGE) | PUPIL-DIVISION IMAGE (A IMAGE) | PUPIL-DIVISION IMAGE (A IMAGE) | PUPIL-DIVISION IMAGE (A IMAGE) |
|---|---|---|---|---|---|
| UNDEREXPOSURE IMAGE DATA | UNDEREXPOSURE IMAGE DATA | UNDEREXPOSURE IMAGE DATA | UNDEREXPOSURE IMAGE DATA | UNDEREXPOSURE IMAGE DATA | UNDEREXPOSURE IMAGE DATA |
| PROPER EXPOSURE IMAGE DATA | PROPER EXPOSURE IMAGE DATA | PROPER EXPOSURE IMAGE DATA | PROPER EXPOSURE IMAGE DATA | PROPER EXPOSURE IMAGE DATA | PROPER EXPOSURE IMAGE DATA |

→ t

FIG. 9B
WITH FULLHD60P

| UNDEREXPOSURE IMAGE DATA | PUPIL-DIVISION IMAGE (A IMAGE) | UNDEREXPOSURE IMAGE DATA | PUPIL-DIVISION IMAGE (A IMAGE) | UNDEREXPOSURE IMAGE DATA | PUPIL-DIVISION IMAGE (A IMAGE) |
|---|---|---|---|---|---|
| PROPER EXPOSURE IMAGE DATA | PROPER EXPOSURE IMAGE DATA | PROPER EXPOSURE IMAGE DATA | PROPER EXPOSURE IMAGE DATA | PROPER EXPOSURE IMAGE DATA | PROPER EXPOSURE IMAGE DATA |

→ t

FIG. 9C
WITH FULLHD120P

| UNDEREXPOSURE IMAGE DATA | PROPER EXPOSURE IMAGE DATA | NORMAL IMAGE (UNDER) | PROPER EXPOSURE IMAGE DATA | NORMAL IMAGE (UNDER) | PROPER EXPOSURE IMAGE DATA | NORMAL IMAGE (UNDER) | PROPER EXPOSURE IMAGE DATA | NORMAL IMAGE (UNDER) | PROPER EXPOSURE IMAGE DATA | PUPIL-DIVISION IMAGE (A IMAGE) | PROPER EXPOSURE IMAGE DATA |

→ t

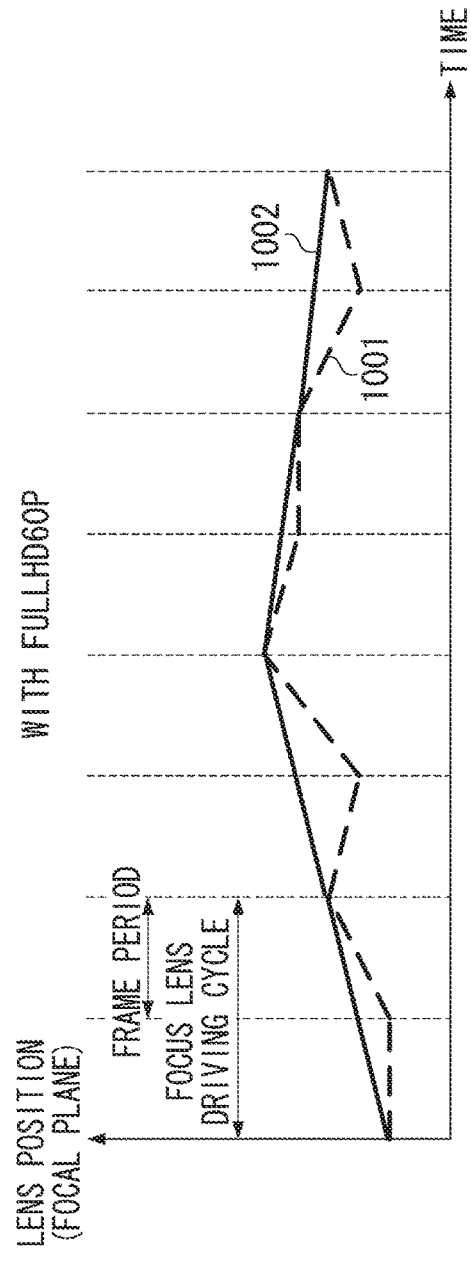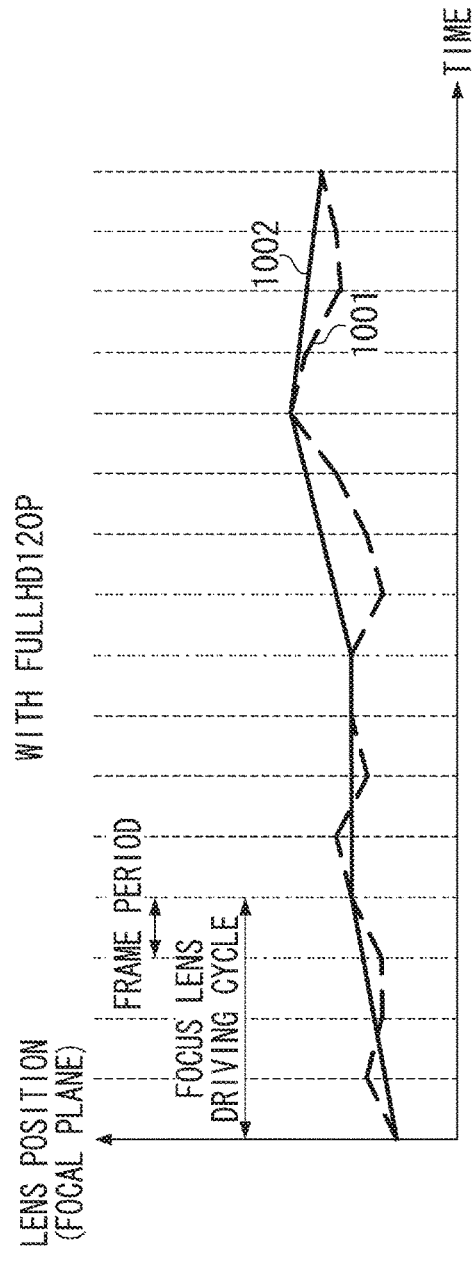

IMAGING APPARATUS

BACKGROUND

Field of Art

The present disclosure relates to an imaging apparatus, and more particularly to an imaging apparatus having a dynamic range expanding function and an automatic focus detection function.

Description of the Related Art

There has been a case where tonality degradation (partial underexposure) in low-luminance portions tonality degradation (partial overexposure) in high-luminance portions occurs in a high-contrast scene captured by a digital camera.

Japanese Patent Application Laid-Open. No. 2000-50151 discusses a technique for generating image data having a wide dynamic range by capturing two images of the same object with different exposure amounts and composing the two sets of image data.

A technique is known by which the focus detection is performed by obtaining a phase difference through an image sensor having a plurality of photoelectric conversion unit for each micro lens.

For example, Japanese Patent Application Laid-Open No. 2008-134389 discusses a technique for performing the focus detection by obtaining a phase difference and, at the same time, generating image data based on a conventional signal processing technique.

SUMMARY

According to an aspect of the present disclosure, an imaging apparatus including an optical system for forming an object image, and configured to acquire the object image as image signals at a predetermined frame rate, includes an imaging unit configured to output a plurality of image signals with different exposures and a focus detection signal for performing the phase difference detection, and a composition unit configured to compose the plurality of image signals with different exposures output from the imaging unit to output the composed image signal, wherein, in outputting the plurality of image signals with different exposures at the predetermined frame rate, the imaging unit outputs the focus detection signal as a substitute for a part of the plurality of image signals with different exposures at a predetermined timing, and wherein, in composing the plurality of image signals with different exposures, the composition unit uses the image signals acquired before the predetermined timing instead of a part of the image signals replaced at the predetermined timing.

Further features of the present invention will become apparent from the following description of exemplary embodiments with reference to the attached drawings.

BRIEF DESCRIPTION OF THE DRAWINGS

FIGS. 9A, 9B, and 9C respectively illustrate timings for reading signals according to the first exemplary embodiment.

FIGS. 10A and 10B illustrate lens positions (focal planes) respectively according to different frame rates and focus lens driving cycles according to the first exemplary embodiment.

DESCRIPTION OF THE EMBODIMENTS

Exemplary embodiments will be described in detail below with reference to the accompanying drawings. The exemplary embodiments described below are to be considered as just examples, and the present invention is not limited to the configurations described in these exemplary embodiments.

Figure 1:
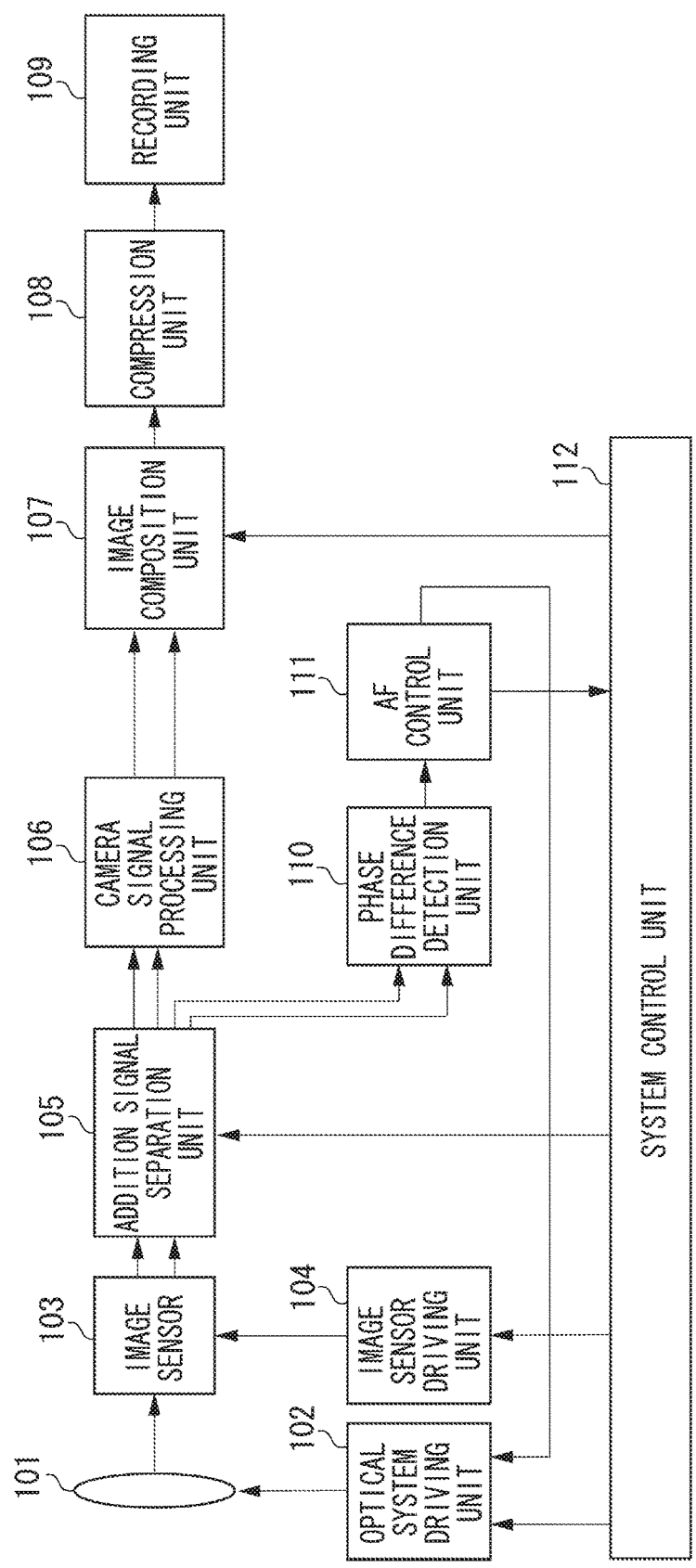
FIG. 1 is an overall block diagram illustrating an imaging apparatus according to a first exemplary embodiment.

FIG. 1 is an overall block diagram illustrating an imaging apparatus according to the first exemplary embodiment.

An optical system 101 for forming an object image includes at least one of a zoom lens, a diaphragm, and a focus lens. An optical system driving unit 102 drives and controls the optical system 101 according to focus information output from an autofocus (AF) control unit 111 (described below) and optical system drive information of a system control unit 112 (described below). The optical system 101 may include an anti-vibration mechanism for reducing the influence of vibration of the imaging apparatus on the image to be captured. The optical system 101 may be an interchangeable lens which is attachable to and detachable from the imaging apparatus. In this case, information about the focus length and diaphragm value of the interchangeable lens may be pre-stored in a memory provided in the interchangeable lens, and the imaging apparatus may acquire the information via communications between the interchangeable lens and the imaging apparatus.

An image sensor 103 converts the object image that has passed the optical system 101 into an electric signal through photoelectric conversion. Examples of image sensors include a complementary metal oxide semiconductor (CMOS) image sensor and an area sensor using a photoelectric conversion film. The image sensor 103 according to the first exemplary embodiment can output not only a plurality of image data (image signals) with different gains and/or different exposures such as the exposure time but also a pupil-division image signal for focus detection.

An image sensor driving unit 104 controls the image sensor 103 according to image sensor drive command information from the system control unit 112. Depending on the control signal output from the image sensor driving unit 104, the image sensor 103 switches the drive mode between a mode for outputting two sets of image data with different exposures and a mode for outputting one set of image data and pupil-division image data for focus detection. The image data and the pupil-division image data will be described in detail below with reference to FIGS. 6 and 7. The image sensor drive command information includes a signal for switching the drive mode of the image sensor 103, setting parameters for determining the exposure the image sensor 103, and a vertical or horizontal synchronization signal.

When the image data and the pupil-division image data for focus detection are output from the image sensor 103, an addition signal separation unit 105 generates under control of the system control unit 112 another pupil-division data for detecting the phase difference by using the image data and the pupil-division image data. Then, the addition signal separation unit 105 outputs to a phase difference distance measurement unit 110 two sets of pupil-division image data including the pupil-division image data (first image data) output from the image sensor 103 and the pupil-division image data (second image data) generated by the addition signal separation unit 105. In addition, the addition signal separation unit 105 outputs image data (third image data) to a camera signal processing unit 106 (described below). According to the present exemplary embodiment, the pupil-division image data corresponds to a focus detection signal for performing the phase difference detection.

When the image sensor 103 is set to the drive mode for outputting two sets of image data with different exposures, the addition signal separation unit 105 outputs two sets of image signals to the camera signal processing unit 106 without generating the pupil-division image data. In other words, the addition signal separation unit 105 performs an operation for switching the image data to be output depending an whether the pupil-division image data is input from the image sensor 103. Further, the image sensor 103 according to the present exemplary embodiment also allows the setting of the drive mode for outputting both two sets of image data with different exposures and the pupil-division image data. The image sensor 103 may act as a component of or as an imaging unit which outputs image signals. One or more components of the image sensor 103 may be configured as an acquisition unit that acquires image signals.

The camera signal processing unit 106 performs predetermined image processing such as color conversion and white balance correction on image data obtained from the addition signal separation unit 105, and outputs the processed image data to an image composition unit 107. The composition unit 107 may be implemented as circuitry and/or instructions executed by a processor.

The image composition unit 107 composes the two sets of image data with different exposures to generate one set of composed image data. The composed image data is encoded by a compression unit 108 and is recorded on a recording medium by a storage unit 109. The recording medium may be attachable to and detachable from the imaging apparatus, built in the imaging apparatus, or disposed out of the imaging apparatus via a predetermined communication unit. In addition to image data, a setting file of parameters to be used in the imaging apparatus may be stored in a storage medium and read via the storage unit 109.

A phase difference detection unit 110 calculates a phase difference evaluation value for performing distance measurement based on the phase difference by using the two sets of pupil-division image data obtained from the addition signal separation unit 105. An AF control unit 111 calculates focus information for controlling the focus position of the optical system 101 based on the phase difference evaluation value calculated by the phase difference detection unit 110.

The focus information includes the distance to the object to be focused, out-of-focus amount, phase difference, and focus position.

A system control unit 112 controls the entire imaging apparatus and sets various parameters. The system control unit 112 includes a central processing unit (CPU) and a field-programmable gate array (FPGA). The system control unit 112 further includes an electrically erasable memory as a storage unit (not illustrated) and executes a program stored in this memory. In addition, the memory is used as a program storage area for storing a program to be executed by the system control unit 112, a work area used during program execution, and a data storage area. In addition, the memory also stores initial values of various parameters as setting information to be used by the system control unit 112 to control the imaging apparatus. The system control unit 112 also includes a communication unit (not illustrated) used to receive various control commands from an external apparatus such as a personal computer (PC) and transmit responses response to various control commands and generated image data to an external apparatus. Further, based on the imaging scene, drive mode, and imaging information acquired from object detection, the system control unit 112 outputs drive information for the optical system 101 including the zoom lens and diaphragm to the optical system driving unit 102. In addition, the system control unit 112 outputs to the image sensor driving unit 104 the drive information of the image sensors 103, such as a drive mode switching command for specifying whether to read two sets of image data with different exposures or read one set of image data and the pupil-division image data, and the exposure time.

The imaging apparatus according to the present exemplary embodiment may further include a display unit for displaying image data and an operation unit including a combination of a touch panel and switches. The display unit displays image data stored in the memory included in the system control unit 112 and a recording medium. The setting information including the drive mode input from the operation unit by the user is once stored in the memory of the system control unit 112 and then read out when necessary.

Figure 2:
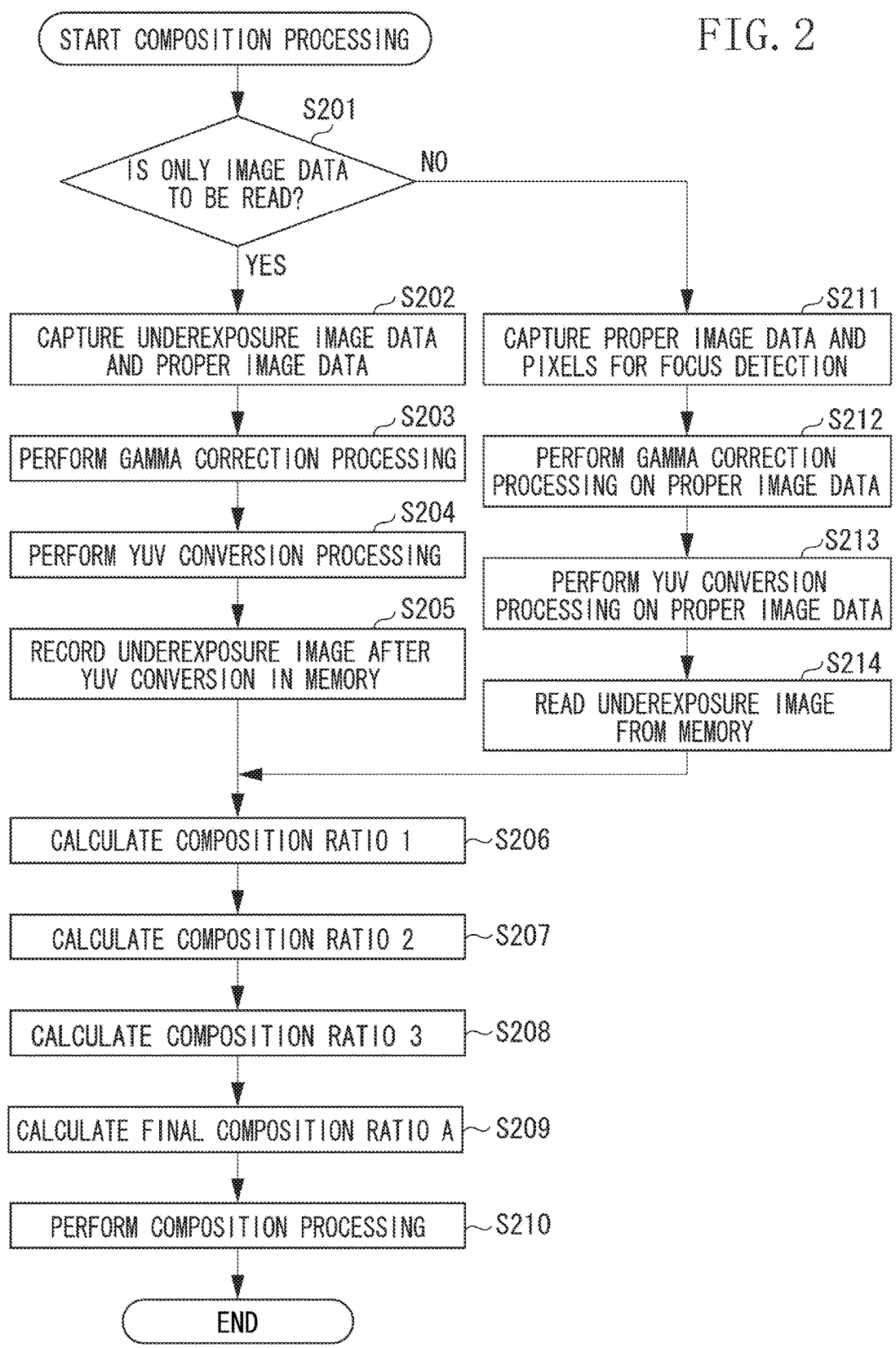
FIG. 2 is a flowchart illustrating a flow of composition processing of the imaging apparatus according to the first exemplary embodiment.
Figure 3:
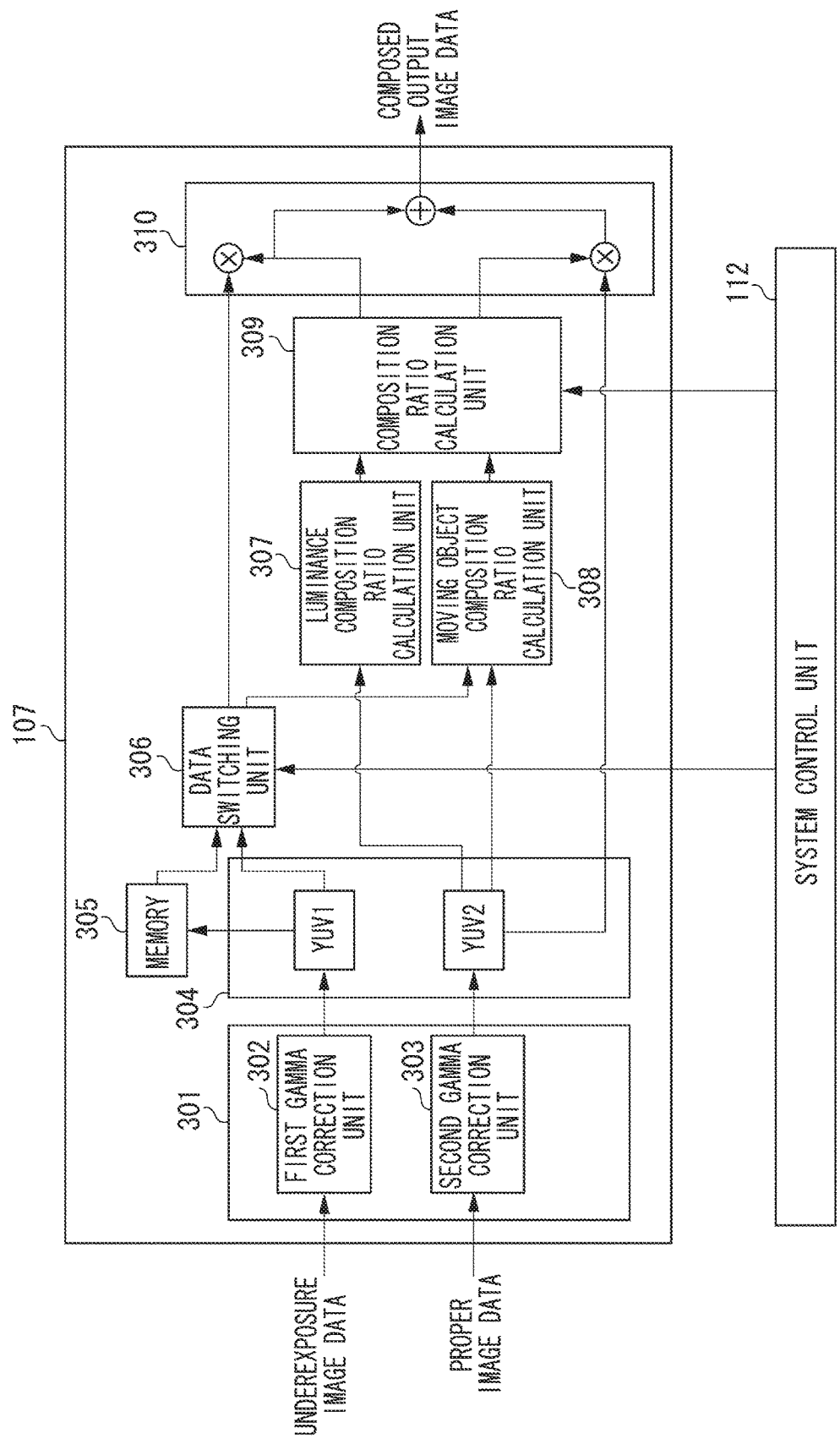
FIG. 3 illustrates a configuration of an image composition unit according to the first exemplary embodiment.

Next, image composition processing performed by the imaging apparatus according to the first exemplary embodiment will be described below with reference to FIGS. 2 and 3. FIG. 2 is a flowchart illustrating a flow of the composition processing controlled by the system control unit 112 according to the first exemplary embodiment. FIG. 3 illustrates an internal configuration of the image composition unit 107 according to the first exemplary embodiment.

In step S201, the system control unit 112 reads from the memory the drive mode information to be set to the image sensor driving unit 104. More specifically, the system control unit 112 reads the drive mode, i.e., a drive mode for reading two sets of image data with different exposures or a drive mode for reading one set of image data and the pupil-division image data. When the read drive mode is the drive mode for reading two sets of image data with different exposures (YES in step S201), the processing proceeds to step S202. On the other hand, when the read drive mode is the drive mode for reading one set of image data and the pupil-division image data (NO in step S201), the processing proceeds to step S211.

In step S202, the system control unit 112 sets the drive mode for acquiring image data with underexposure and image data with the proper exposure to the image sensor driving unit 104. Wherein underexposure and overexposure are both examples of non-proper exposure. Then, the system control unit 112 controls the camera signal processing unit 106 to perform image processing on each of the captured image with underexposure (hereinafter, also referred to as an underexposure image) and the captured image with the proper exposure (hereinafter, also referred to as a proper image). Then, the system control unit 112 controls the camera signal processing unit 106 to input each image data to the image composition unit 107. Then, the processing proceeds to step S203.

In step S203, the system control unit 112 controls the image composition unit 107 to perform the gamma correction processing on each image data. The internal configuration of the image composition unit 107 will be described in detail below with reference to FIG. 3. The image data input from the camera signal processing unit 106 is input to the gamma correction unit 301. As illustrated in FIG. 3, the gamma correction unit 301 includes a first gamma correction unit 302 and a second gamma correction unit 303 to enable performing the gamma correction processing with different characteristics on each of the underexposure image data and the proper image data. According to the present exemplary embodiment, the first gamma correction unit 302 performs the gamma correction processing on the underexposure image data, and the second gamma correction unit 303 performs the gamma correction processing on the proper image data. The first gamma correction unit 302 and the second gamma correction unit 303 perform the gamma correction processing with different characteristics.

Figure 4:
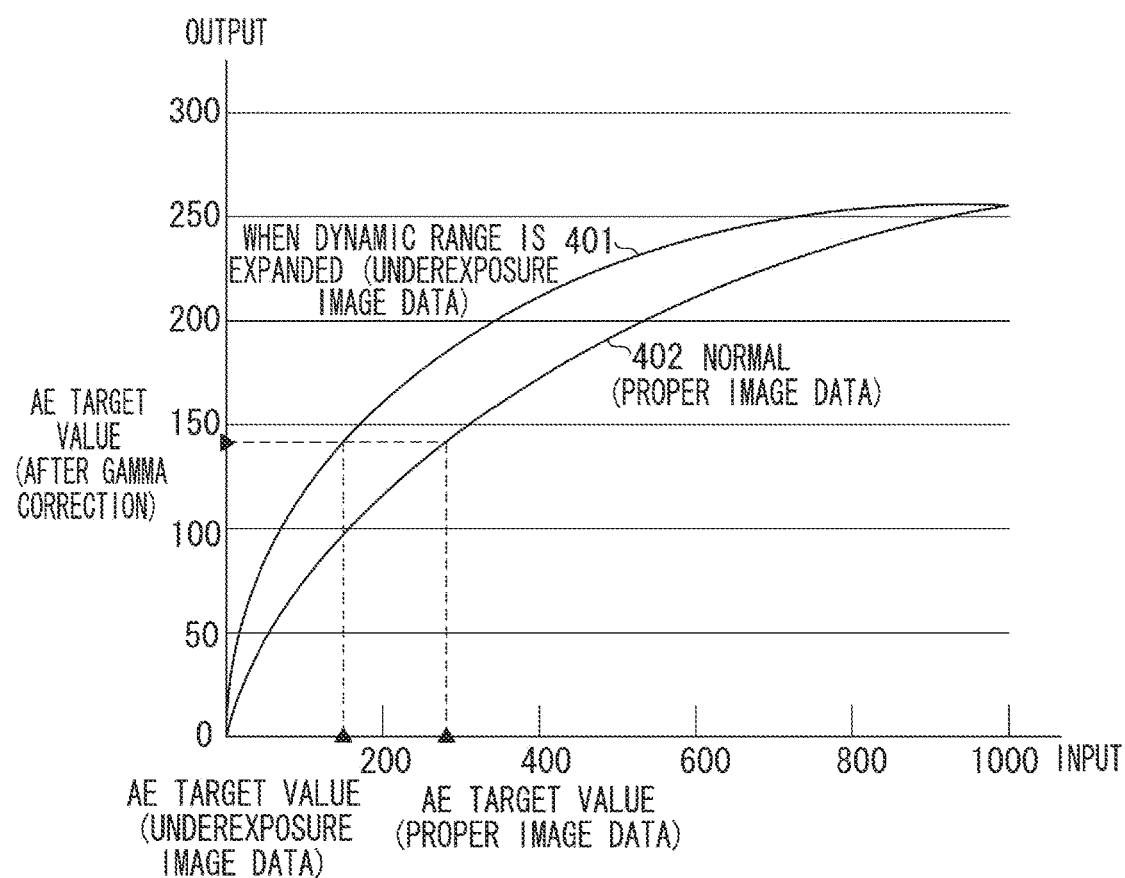
FIG. 4 illustrates a gamma correction unit according to the first exemplary embodiments.

The gamma correction processing according to the present exemplary embodiment will be described below with reference to FIG. 4. Referring to FIG. 4, a curve 401 (hereinafter also referred to as a first gamma curve) indicates the characteristics of the gamma correction processing by the first gamma correction unit 302, and a curve 402 (hereinafter also referred to as a second gamma curve) indicates the characteristics of the gamma correction processing by the second gamma correction unit 303.

The output value assigned to the vertical axis corresponds to the input value assigned to the horizontal axis. The gamma correction processing is performed on the value of each pixel of image data by using the curves 401 and 402. The first gamma curve is set so that the AE target value of the underexposure image data after the gamma correction coincides with the AE target value of the proper image data after the gamma correction using the second gamma curve.

The dynamic range can be expanded by lowering the AE target value of the underexposure image data before the gamma correction. However, simply decreasing the AE target value causes underexposure and resulting in dark underexposure image data. Therefore, according to the first exemplary embodiment, the first gamma curve is determined so as to perform the gamma correction to brighten the underexposure image data according to the amount of expansion of the dynamic range. Thus, the dynamic range can be expanded to an expanded dynamic range while properly maintaining the brightness (exposure) of the underexposure image data.

Although, in the first exemplary, the decrease in luminance of the underexposure image data due to the decrease of the AE target value before the gamma correction is corrected through the gamma correction, similar luminance correction may be performed by using another processing method such as a lookup table.

The gain as a white balance coefficient for white balance correction and the clipping amount for determining the amount of a saturation signal may be controlled. More specifically, the same effect can also be acquired by performing analog-to-digital (A/D) conversion on image data with the gain decreased by the reduced exposure amount or gain, increasing the gain by using a signal processing circuit in a subsequent stage, and expanding the clipping amount (increasing the amount of the saturation signal) by the increased amount of gain.

The flowchart illustrated in FIG. 2 will be described again below. In step S204, the system control unit 112 controls a color luminance conversion circuit 304 included in the image composition unit 107. More specifically, the system control unit 112 converts the underexposure image data after the gamma correction into YUV1 data and, at the same time, converts the proper image data after the gamma correction into YUV2 data via the color luminance conversion circuit 304. Then, the processing proceeds to step S205.

In step S205, the system control unit 112 records the YUV1 data converted by the color luminance conversion circuit 304 included in the image composition unit 107 in the memory 305 included in the image composition unit 107. Then, the processing proceeds to step S206. Recording the YUV1 data in the memory 305 in this way enables composing the YUV1 data and the proper image data read from the image sensor 103 at a different timing. In other words, since the underexposure image mainly includes information about high-luminance areas (for example, the sky in outdoor imaging and windows areas in indoor imaging) in the object image, not all frames are required in some cases. In such a case, the system control unit 112 controls a data switching unit 306 to read the underexposure image data (YUV1 data) recorded in the memory 305, so that thinning out of the reading of the underexposure image can be performed. According to the present exemplary embodiment, in frames in which the underexposure image is not read out, the system control unit 112 performs control to read the pupil-division image data for focus detection instead of the underexposure image. Although, in the present exemplary embodiment, only the memory 305 for storing the YUV1 data converted from the underexposure image data is provided, another memory for storing the YUV2 data converted from the proper image data may be provided. This configuration enables thinning out the proper image data instead of the underexposure image data.

Figure 5A:
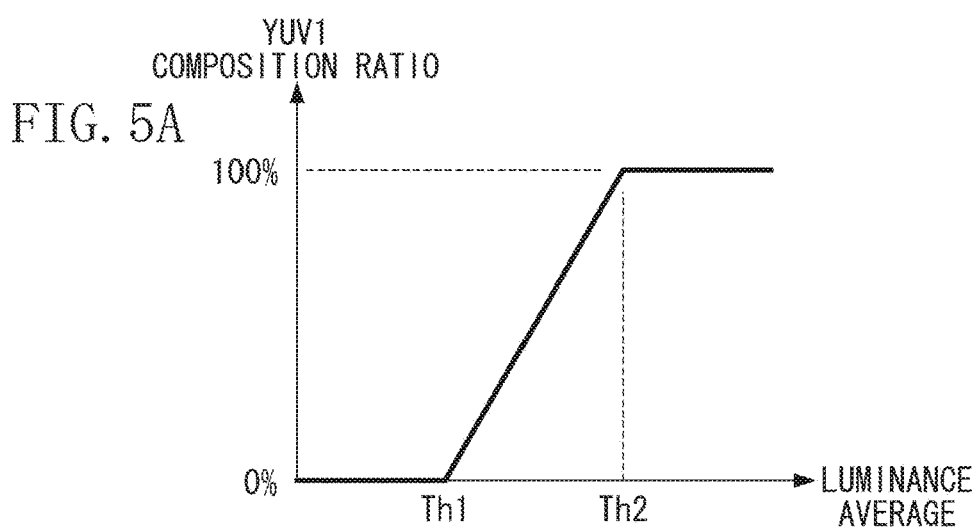
FIGS. 5A, 5B, and 5C illustrate methods for determining a composition ratio of image data according to the first exemplary embodiment.

In step S206, the system control unit 112 controls a luminance composition ratio calculation unit 307 included in the image composition unit 107 to calculate the composition ratio 1 based on the luminance of each image region of the YUV2 data. Then, the processing proceeds to step S207. For example, the image data is divided into a plurality of regions, and the composition ratio 1 is calculated for each division region based on the average luminance of an image region with n×m pixels (n and m are integers) included in the division region. An image region having a higher average luminance is more likely to cause an overexposure. Therefore, as illustrated in FIG. 5A, the composition ratio 1 according to the present exemplary embodiment is calculated so as to increase the composition ratio of the YUV1 data for the image region.

Figure 5B:
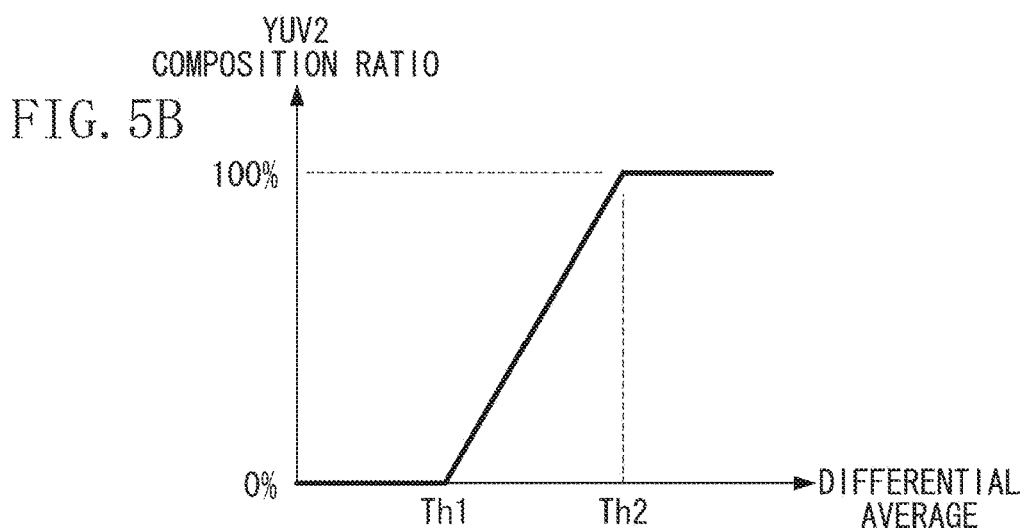

In step S207, the system control unit 112 controls a moving object composition ratio calculation unit 308 included in the image composition unit 107 to extract a moving object region based on the YUV1 and YUV2 data and calculate the composition ratio 2. More specifically, the moving object composition ratio calculation unit 308 calculates the luminance difference and color difference in each image region with p×q pixels (p and q are integers) in the YUV1 and YUV2 data. As illustrated in FIG. 5B, with a large luminance difference and a large color difference in each image region, the moving object composition ratio calculation unit 308 extracts each image region as a region where a moving object exists. The moving object composition ratio calculation unit 308 calculates the composition ratio 2 so as to increase the composition ratio of the YUV2 data for the extracted image region. Then, the processing proceeds to step S208.

Figure 5C:
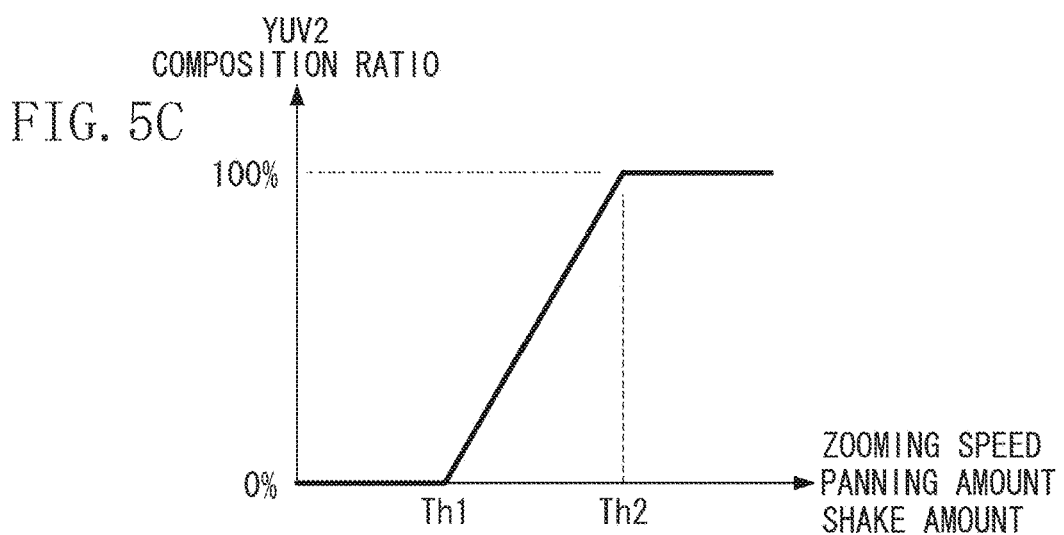

In step S208, the system control unit 112 controls the composition ratio calculation unit 309 included in the image composition unit 107 to input status information of the imaging apparatus and calculates the composition ratio 3 based on the status information. The status information of the imaging apparatus indicates the status of the imaging apparatus when capturing a moving image, such as the zooming speed in optical zoom, the panning amount output from gyroscope information, and the shake amount. The composition ratios 1, 2, and 3 are determined by obtaining at least one piece of the status information. In this case, the system control unit 112 serves as a shake detection unit for detecting these outputs and as a calculation unit for acquiring the zoom lens position and calculating the zooming speed. Then, the processing proceeds to step S209. With a high zooming speed in optical zoom, a large panning amount, or a large shake amount, desired target composed image data cannot be obtained because of the difficulty in the composition processing on the YUV1 and YUV2 data. Therefore, as illustrated in FIG. 5C, the composition ratio calculation unit 309 calculates the composition ratio 3 so as to increase the composition ratio of the YUV2 data with increasing zooming speed in optical zoom, panning amount, and shake amount. The composition ratio calculation unit 309 may be implemented as circuitry or as instructions executed by a processor.

In step S209, the system control unit 112 controls the composition ratio calculation unit 309 included in the image composition unit 107 to calculate the final composition ratio $\alpha$ based on the composition ratios 1, 2, and 3. As the calculation method, the composition ratio calculation unit 309 determines the maximum value of the composition ratios 1, 2, and 3 as the final composition ratio $\alpha$. The product of the composition ratios 1, 2, and 3 may be used as the final composition ratio $\alpha$. Then, the processing proceeds to step S210.

In step S210, the system control unit 112 controls the load addition unit 310 included in the image composition unit 107 to perform composition processing by performing the weighted addition on the YUV1 and YUV2 data based on the final composition ratio $\alpha$, as represented by the following formula. As the result, composed output image data is generated.

$$YUV1 \times \alpha + YUV2 \times (1-\alpha) = \text{Composed output image data}$$

The generated composed output image data is output to the compression unit 108. Then, the processing ends. In steps S206 to S208, calculation threshold values (Th1 and Th2) when obtaining the composition ratio may not be fixed but variable depending on the imaging mode. In step S201, the composition ratios or calculation threshold values may be differentiated depending on the result of the determination whether to read the pupil-division image. More specifically, when the pupil-division image is not to be read, the underexposure image data stored in the memory 305 is used. However, since there is a time difference between the proper image data and the underexposure image data, it is desirable to increase the composition ratio of the proper image data.

On the other hand, a case where, in step 3201, the mode is the drive mode for reading one set of image data and the pupil-division image data will be described below. In step S211, the system control unit 112 sets the drive mode for acquiring image data with the proper exposure and image data with the pupil-division image to the image sensor driving unit 104. Then, the system control unit 112 controls the camera signal processing unit 106 to perform image processing on the captured proper image. Then, the system control unit 112 controls the camera signal processing unit 106 to input the image data to the image composition unit 107. Then, the processing proceeds to step S212.

Although steps S212 and S213 differ from steps S203 and 3204 in that processing is performed only on the proper image data, the processing itself in steps S212 and S213 is similar to the processing in steps S203 and S204. Therefore, detailed descriptions of the processing will be omitted.

In step S214, the system control unit 112 controls the image composition unit 107 to read the YUV1 data recorded in the memory 305 included in the image composition unit 107. Then, the processing proceeds to step 3206.

Although, in step S201 of the flowchart illustrated in FIG. 2, the system control unit 112 determines whether the read drive mode is the drive mode for reading the pupil-division image data, the processing of this flowchart is also applicable to a case where a drive mode other than this mode is performed. For example, when the set drive mode is the drive mode for outputting both two sets of image data and the pupil-division image data with different exposures, the processing may proceed to step S202.

According to the first exemplary embodiment, the system control unit 112 determines the composition ratio of the image data taking into consideration the status information of the imaging apparatus when capturing a moving image. Therefore, even in a case where a camera work such as optical zoom and panning is applied or a case where a camera shake occurs when capturing a moving image, the most suitable dynamic range expansion processing can be performed.

Figure 6:
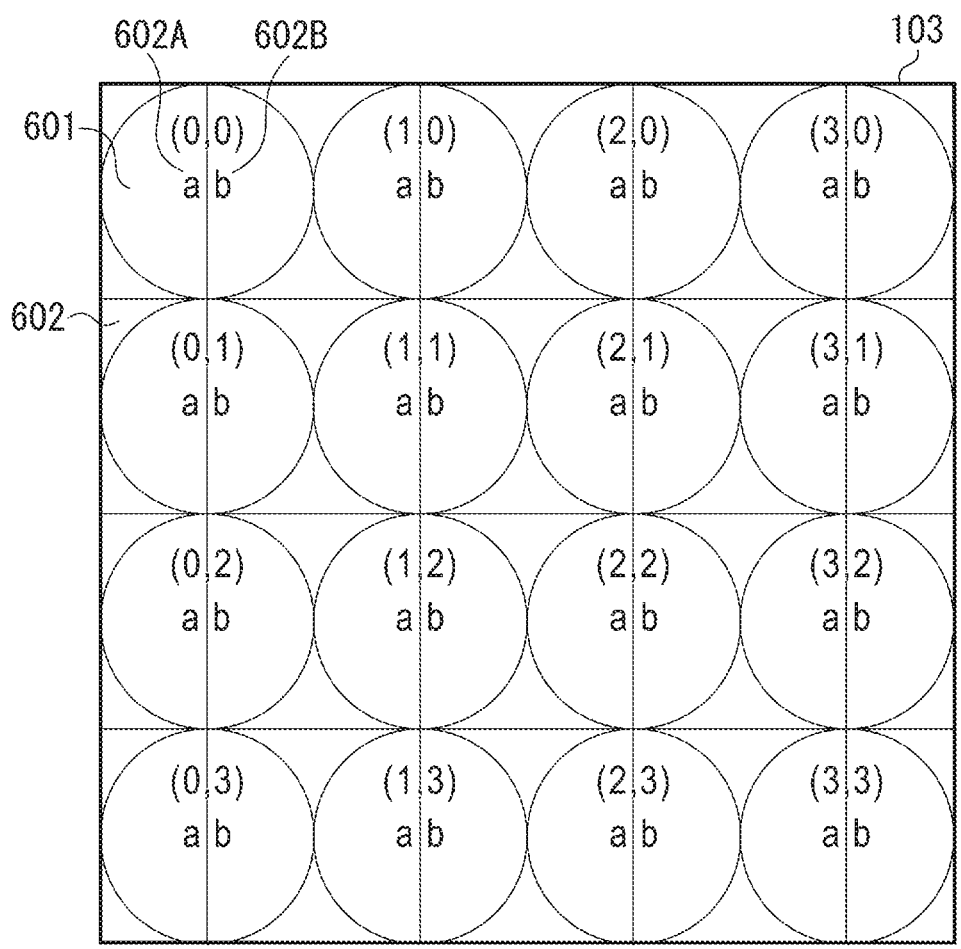
FIG. 6 is a block diagram illustrating a configuration of an image sensor.

The phase difference detection unit 110 and the AF control unit 111 according to the first exemplary embodiment will be described below with reference to FIGS. 6, 7, and 8.

The image sensor 103 according to the first exemplary embodiment will be described below with reference to FIG. 6. FIG. 6 illustrates the image sensor 103 when viewed from the optical system 101. According to the present exemplary embodiment, each of micro lenses 601 forming a micro lens array is one unit pixel 602. A plurality of photoelectric conversion units is arranged for each micro lens 601. According to the present exemplary embodiment, a plurality of photoelectric conversion units is arranged for the unit pixel 602. According to the present exemplary embodiment, the unit pixel 602 includes two photoelectric conversion units, photoelectric conversion units 602A and 602B, in the horizontal direction (X-axis direction).

Figure 7:
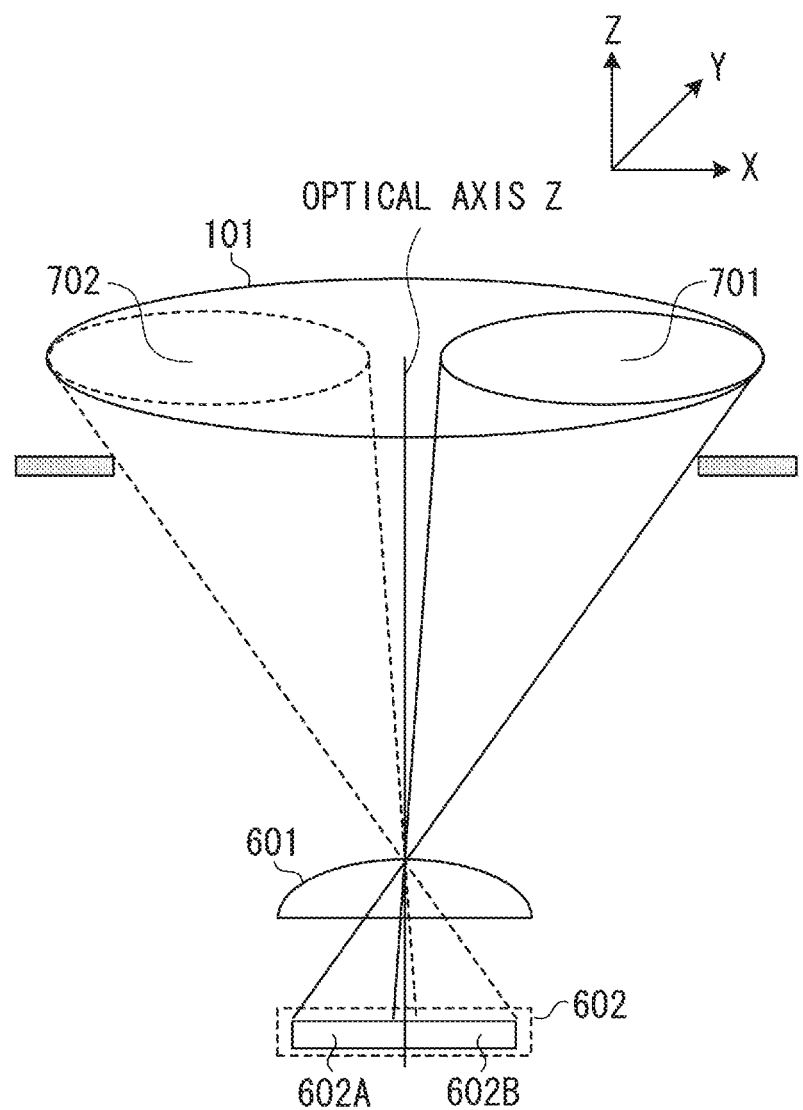
FIG. 7 is a schematic view illustrating a light flux incident onto a unit pixel through an exit pupil of an imaging lens.
Figure 8:
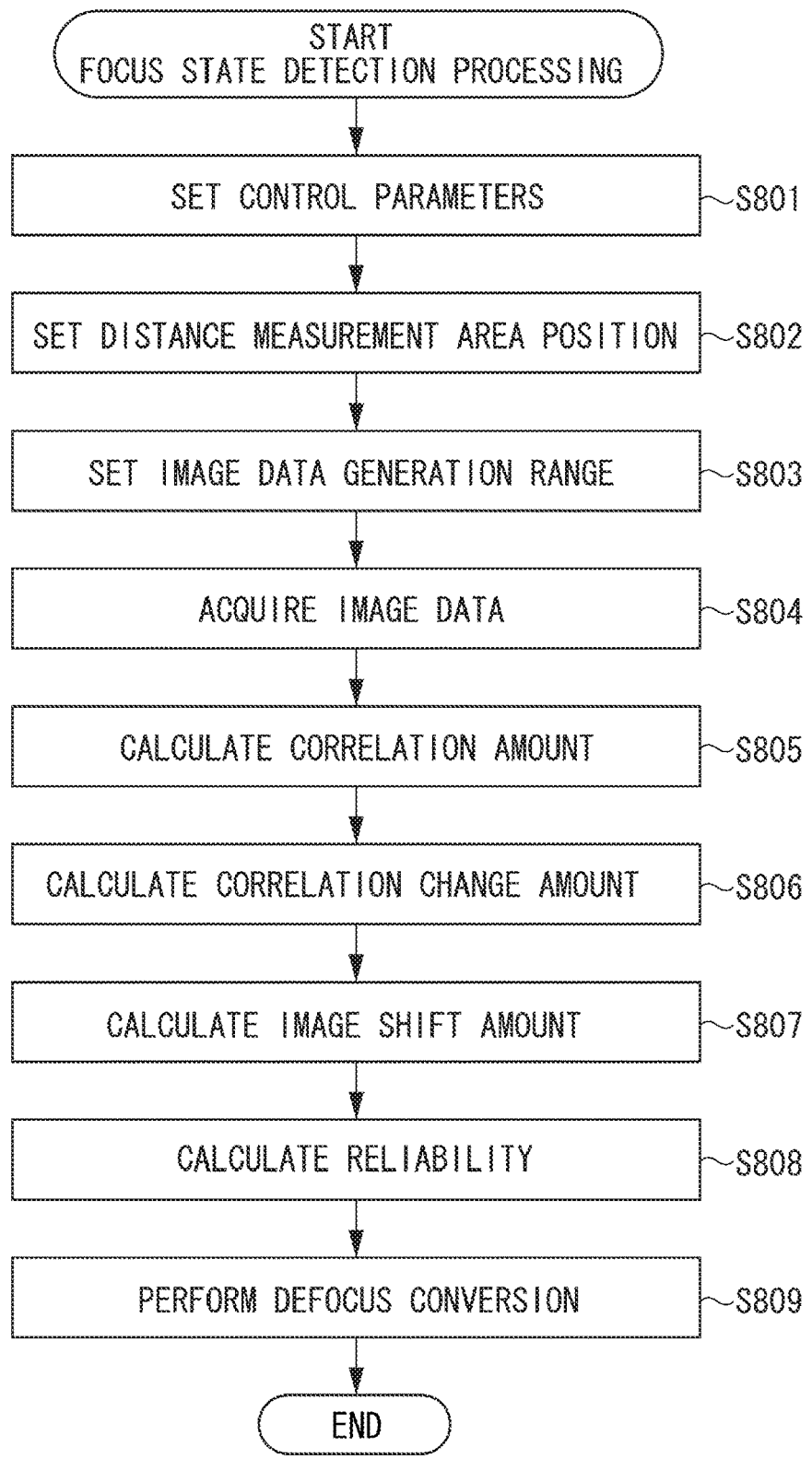
FIG. 8 is a flowchart illustrating focus state detection processing according to the first exemplary embodiment.

FIG. 7 illustrates a state where light output from the optical system 101 passes through one micro lens 601 and is received by the image sensor 103 when viewed from the direction (Y-axis direction) perpendicular to an optical axis Z. Exit pupils 701 and 702 of the optical system 101 correspond to the photoelectric conversion units 602A and 602B, respectively. Light that has transmitted through the exit pupil 701 and light that has transmitted through the exit pupil 702 enter the unit pixel 602 centering on the optical axis Z. As illustrated in FIG. 7, a light flux that has transmitted through the pupil region 701 passes through the micro lens 601 and is received by the photoelectric conversion unit 602A, and a light flux that has transmitted through the pupil region 702 passes through the micro lens 601 and is received by the photoelectric conversion unit 602B. Therefore, the photoelectric conversion units 601A and 601B receive light from different regions of the exit pupil (pupil-division) of the optical system 101.

In this way, pupil-division signals of the photoelectric conversion unit 601A are acquired from a plurality of the unit pixels 602 arranged in the X-axis direction. An object image formed by these output signal groups is assumed as an A image. Similarly, pupil-division signals of the photoelectric conversion unit 601B are acquired from a plurality of the unit pixels 602 arranged in the X-axis direction. An object image formed by these output signal groups is assumed as a B image. According to the present exemplary embodiment, the A and B images correspond to pupil-division images.

Since the A and B images are images shifted in the X-axis direction, the system control unit 112 performs a correlation calculation to detect the image defocus amount (pupil-division phase difference) corresponding to the shift amount. Further, multiplying the image defocus amount by a conversion factor determined based on the focus position and the optical system enables calculating the focus position corresponding to an arbitrary object position in the screen. Imaging plane phase difference AF can be performed by controlling the focus lens based on the calculated focus position information.

The image sensor 103 according to the present exemplary embodiment can read out an A+B image (sum of the A and B image signals). An A+B image signal is equivalent to the image data. Therefore, to obtain the pupil-division image data, it is not necessary to read each of the A and B images. Instead, reading either one of the A and B images as pupil-division image data and subtracting the read image from the A+B image enables calculating the other one of the A and B images. This calculation is performed by the addition signal separation unit 105 as described above with reference to FIG. 1.

The focus detection processing according to the present exemplary embodiment will be described below with reference to FIG. 8. The processing of this flowchart is performed by the system control unit 112.

In step S801, the system control unit 112 acquires imaging parameters to be used for AF included in the optical system 101. Then, the processing proceeds to step S802. The imaging parameters include diaphragm information in the optical system 101 and the focus length. The imaging parameters may include information about exposure conditions including the gain and exposure time related to the signals output from the image sensor 103.

In step S802, the system control unit 112 sets and arranges a distance measurement area position subjected to the focus state detection within a focus detection range included in an imaging range according to the result of an operation performed from the operation unit by the user. In a configuration enabling object detection, when setting and arranging a distance measurement area position, for example, a position where a face has been detected may be set as a distance measurement area position. Then, the processing proceeds to step S803.

In step S803, based on the imaging parameters acquired in step S801 and the distance measurement area position set and arranged in step S802, the system control unit 112 determines a pupil-division signal generation range used for imaging plane phase difference AF. Then, the processing proceeds to step S804. Setting a pupil-division signal generation range corresponds to selecting a range of scanning lines subjected to the A image signal generation in the image sensor 103 illustrated in FIG. 6. For scanning lines not subjected to the pupil-division signal generation, the image sensor 103 generates only one signal as the A+B image signal. Limiting a pupil-division signal generation range only to a required range enables omitting redundant calculation processing and further reducing the readout load and heat generation.

In step S804, the system control unit 112 controls the phase difference detection unit 110 to acquire the pupil-division image data for AF from pixels included the image data generation range set in step S803. Then, the processing proceeds to step S805. More specifically, the system control unit 112 controls the addition signal separation unit 105 to input the image data and the A image signal (pupil-division image data) output from the image sensor 103. The system control unit 112 also controls the addition signal separation unit 105 to separate the B image signal based on the input signal and output the input A image signal and the separated B image signal to the phase difference detection unit 110.

In step S805, the system control unit 112 controls the phase difference detection unit 110 to calculate the correlation amount between the acquired image signals. The phase difference detection unit 110 calculates the correlation amount for each scanning line, in the image data generation range set in step S803, in the distance measurement area. Then, the processing proceeds to step S806.

In steps S804 to S809, the phase difference detection unit 110 performs processing also on each scanning line in the distance measurement area.

In step S806, the system control unit 112 controls the phase difference detection unit 110 to calculate the correlation change amount based on the correlation amount calculated in step S805.

In step S807, the system control unit 112 controls the phase difference detection unit 110 to calculate the image shift amount based an the correlation change amount.

In step S808, the system control unit 112 controls the phase difference detection unit 110 to calculate the reliability of the image shift amount.

In step S809, the system control unit 112 controls the AF control unit 111 to multiply the image shift amount calculated in step S807 by a conversion coefficient to convert the image shift amount into a defocus amount.

Subsequently, the optical system driving unit 102 receives the defocus amount via the system control unit 112 and controls the focus lens based on the defocus amount. Then, the system control unit 112 ends the focus state detection processing.

The image composition unit 107, the phase difference detection unit 110, and the AF control unit 111 have been described in detail above. When simultaneously performing the image composition and phase difference detection, reading focus detection pixels for the phase difference detection in addition to the above-described two sets of image data with different exposure amounts will remarkably increase the data transfer capacity load. As a result, high image quality and high frame rate cannot be achieved.

Operations performed by the imaging apparatus according to the present exemplary embodiment to suitably prevent the increase in the data transfer capacity load with respect to high image quality and high frame rate will be described below with reference to FIGS. 9A to 9C.

FIG. 9A illustrates signals read from the image sensor 103 in a time-sequential manner assuming a signal reading at a frame rate of 30 frames per second (fps) with the Full High Definition (Full HD) moving image resolution. With the imaging apparatus according to the present exemplary embodiment, it is assumed that the data transfer capacity load does not become stringent even when signals for focus detection by the phase difference detection (pupil-division image data) are read in addition to two sets of image data with different exposure amounts, and therefore the imaging apparatus can transmit all of the signals and image data. In other words, the imaging apparatus can output both the image data and the pupil-division image data in time-sequentially adjacent frames.

FIG. 9B illustrates signals read from the image sensor 103 assuming a signal reading at a frame rate of 60 fps with the Full HD moving image resolution. Since a Full HD frame rate of 60 fps is twice a Full HD frame rate of 30 fps, the transmission data capacity load is simply doubled. Therefore, reading pixels for focus detection for the phase difference detection in addition to two sets of image data with different exposure amounts will remarkably increase the data transfer capacity load. Therefore, two sets of data (two sets of image data with different exposure amounts, or one set of image data and the pupil-division image data) are read per frame. Although the pupil-division image (A image) is read once in two frames, this frame rate is set based on the driving cycle of the focus lens by a rate control circuit. The rate control circuit may be implemented as dedicated circuitry or as a set of instructions executed by a processor.

A case where the lens position (focal plane) is adjusted in each frame acquisition cycle and a case where the lens position (focal plane) is adjusted according to the driving cycle of the focus lens will be described below with reference to FIGS. 10A and 10B.

FIG. 10A illustrates a case where the lens position (focal plane) is adjusted according to the frame acquisition cycle and according to the focus lens driving cycle when a Full HD frame rate of 60 fps is assumed.

A line 1001 indicates the position of the focal plane according to the frame rate. A line 1002 indicates the position of the focal plane according to the focus lens driving cycle.

If the focus lens is driven at the position of the focal plane according to the frame acquisition cycle, the focus position is driven at high speed (at intervals of 16.67 milliseconds). This causes frequent movement of the focus position, degrading the moving image quality. On the other hand, performing drive control of the lens position at the focus lens driving cycles enables smoothly moving the focal plane. According to the present exemplary embodiment, the focus lens driving cycle is equivalent to the control cycle for controlling the optical system 101.

FIG. 10B illustrates a case where the lens position (focal plane) is adjusted according to the frame acquisition cycle and according to the focus lens driving cycle when a Full HD frame rate of 120 fps is assumed.

The lines 1001 and 1002 are similar to those illustrated in FIG. 10A. Similar to the case illustrated in FIG. 10A, if the focus lens is driven at the position of the focal plane according to the frame acquisition cycle, the focus position is driven at high speed (at intervals of 8.34 milliseconds). This causes frequent movement of the focus position, degrading the moving image quality.

Although, in the present exemplary embodiment, the frame rate for ideal focus lens drive control is defined to be 30 fps, the frame rate is not limited thereto and may be changed.

Referring to FIG. 9B, the imaging apparatus performs focus lens drive control in units of 30 fps, and the focus detection can also be performed once in two frames if pixels for focus detection are present. Using the underexposure image data in the previous frame immediately before the current one in time-series enables a frame rate of 60 fps, achieving the dynamic range expansion with little influence of a camera shake.

FIG. 9C illustrates signals read from the image sensor 103 assuming a signal reading at a frame rate of 120 fps with the Full HD moving image resolution. A frame rate of 120 fps with the Full HD moving image resolution is twice a frame rate of 60 fps with the Full HD moving image resolution. Since the imaging apparatus performs focus lens drive control in units of 30 fps based on a similar concept to that illustrated in FIG. 9B, the imaging apparatus performs a signal reading once in four frames. Using the underexposure image data in the previous frame immediately before the current one enables a frame rate of 120 fps, achieving the dynamic range expansion with little influence of a shake.

As described above, the imaging apparatus according to the first exemplary embodiment takes into consideration the frame rate, image size, focus lens driving cycle, or moving amount of the object. This makes it possible to provide an imaging apparatus capable of achieving both the dynamic range expansion and the focus detection with a limited data bus and a limited operating frequency by thinning out the underexposure image and reading pixels for focus detection at the timing of the thinning out.

Although, in the present exemplary embodiment, the imaging apparatus performs an operation for thinning out the underexposure image data at a frame rate of 60 fps higher when reading image signals with the Full HD moving image resolution, the operation is not limited thereto. For example, thinning out timings other than 120 fps may also be applied, and the underexposure image data may be thinned out when switching from the Full HD moving image resolution to the 4K format moving image resolution or higher. In a case where the data rate changes to increase, thinning out a part of the image data enables achieving both the dynamic range expansion and the focus detection.

Although, in the present exemplary embodiment, the underexposure image data is thinned out (the pupil-division image data is read) at fixed intervals even when the frame rate increases, the intervals are not limited thereto and may be changed according to the focus length of the optical system 101 and a change of the object image.

Figure 11:
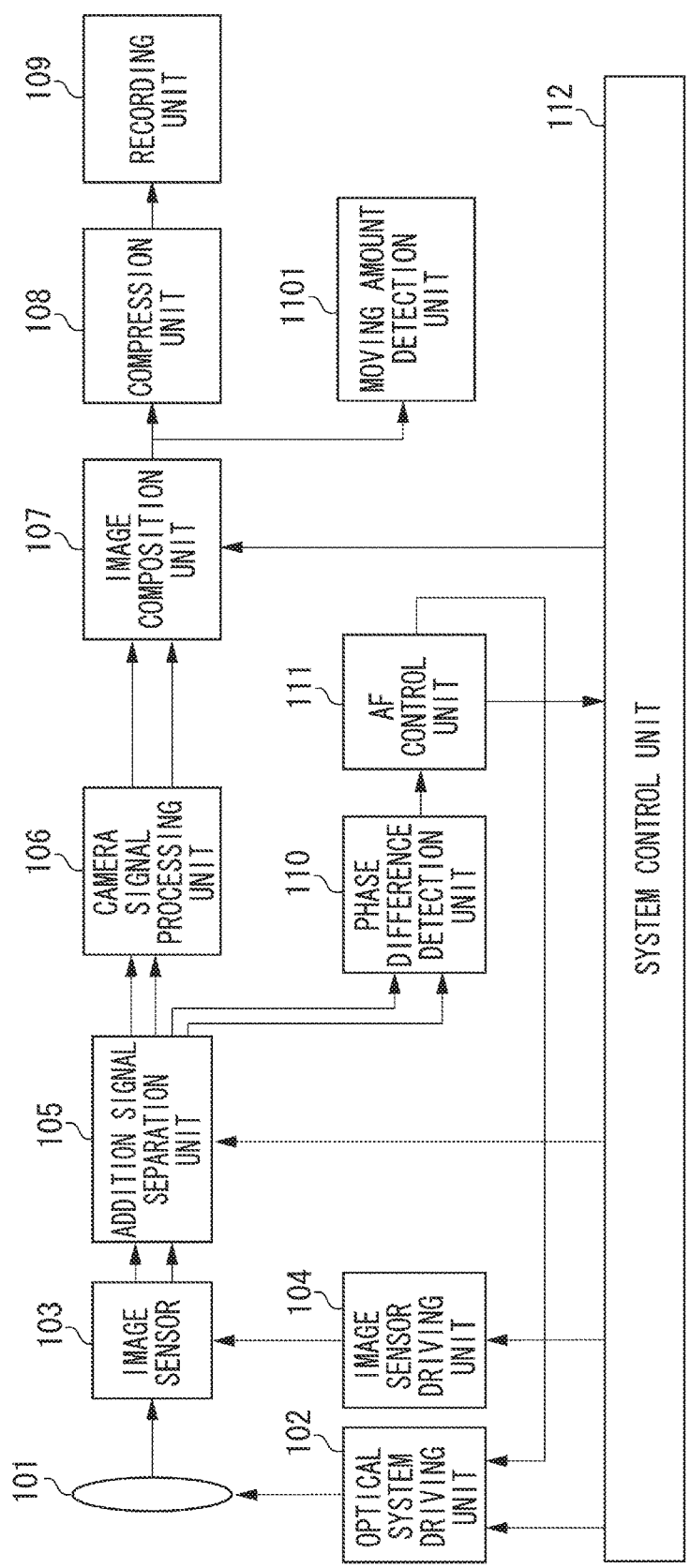
FIG. 11 is an overall block diagram illustrating an imaging apparatus according to a second exemplary embodiment.

FIG. 11 is an overall block diagram illustrating an imaging apparatus according to a second exemplary embodiment.

Referring to FIG. 11, a moving amount detection unit 1101 for detecting a moving amount of the object is added to the configuration according to the first exemplary embodiment illustrated in FIG. 1. For components similar to those in the first exemplary embodiment, detailed descriptions will be omitted.

The moving amount detection unit 1101 calculates inter-frame moving amounts of an object and cumulative moving amount as the sum of inter-frame moving amounts of the object. Then, the moving amount detection unit 1101 outputs to the system control unit 112 a command for reading the pupil-division image data from the calculated inter-frame moving amounts and the cumulative moving amount. The system control unit 112 performs control to read the pupil-division image data according to the output of the moving amount detection unit 1101.

Figure 12:
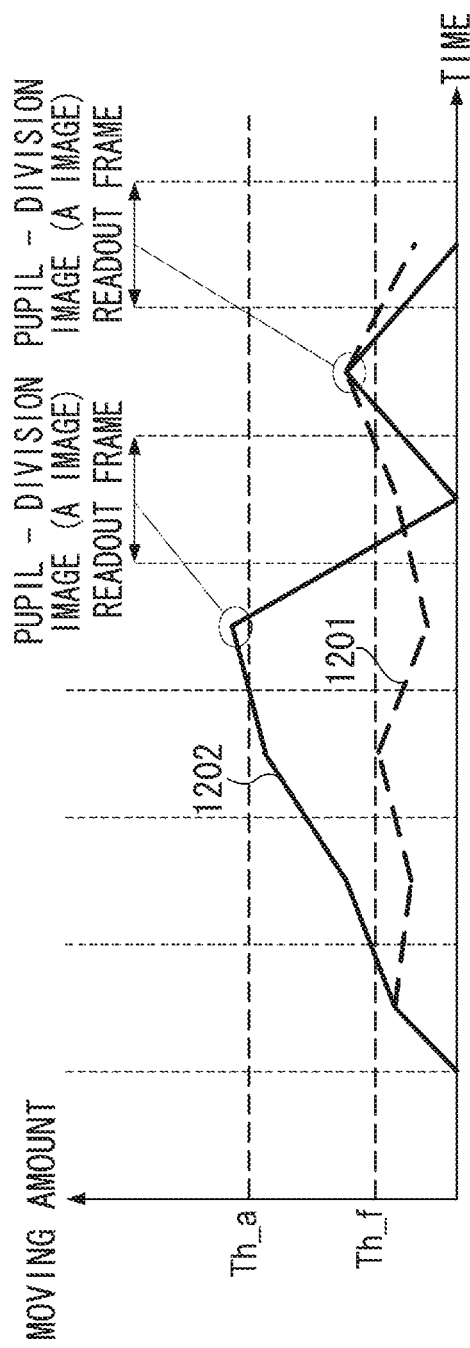
FIG. 12 illustrates an inter-frame moving amount and a cumulative moving amount according to the second exemplary embodiment.

The timing of reading the pupil-division image data based on the moving amount of the object will be described below with reference to FIG. 12. FIG. 12 illustrates a relationship between the moving amount of the object and time. Referring to FIG. 12, the horizontal axis represents time and the vertical axis represents the moving amount of the object. A line 1201 indicates the inter-frame moving amount, and a line 1202 indicates the cumulative moving amount as the sum of inter-frame moving amounts for the number of frames. The inter-frame moving amount is calculated by performing known block matching processing on blocks corresponding to preceding and following frame images and statistically processing the image shift amount. For example, positive moving amounts are calculated in succession as the inter-frame moving amounts. The cumulative moving amount is calculated by sequentially adding these inter-frame moving amounts.

A threshold value for the inter-frame moving amounts is assumed as Th_t, and a threshold value for the cumulative moving amount is assumed as Th_a. When the two different moving amounts exceed the respective threshold values, the system control unit 112 considers that the moving amount has reached a certain amount and reads the pupil-division image data in the following frame. In other words, the moving amount of the object has reached a predetermined amount and therefore the object may possibly be out of the in-focus range. Then, the system control unit 112 performs control to read the pupil-division image data to perform AF again.

When the inter-frame moving amount exceeds the threshold value Th_t or when the cumulative moving amount exceeds the threshold value Th_a, the system control unit 112 performs reset processing on the cumulative moving amount.

As described above, the imaging apparatus achieves both the focus detection and the dynamic range expansion by reading the pupil-division image in the following frame when the inter-frame moving amount exceeds the threshold value or cumulative moving amount exceeds the threshold value.

Although, in the first and the second exemplary embodiments, the system control unit 112 performs control to determine whether to read the pupil-division image data, the processing is not limited thereto. For example, a control unit provided in the image sensor 103 in a stacked level structure (stacked type) may determine whether to read the pupil-division image data based on the focus lens driving cycle or the moving amount of the object. When the image sensor 103 has such a stacked level structure, a memory for temporarily saving image data or phase difference detection unit may be provided in the image sensor 103 in addition to a control unit.

As illustrated in FIGS. 9A to 9C, the imaging apparatus performs an operation for substituting the pupil-division image data for the underexposure image data when acquiring the underexposure image data and proper image data at a predetermined frame rate, the substitution may be performed not in frame units. For example, a predetermined area in the underexposure image data may be replaced with the pupil-division image data, or the replacement may be performed in line or pixel units.

Other Embodiments

An embodiment of can also be achieved when a program for implementing at least one of the above-described functions is supplied to a system or apparatus via a network or storage medium, and at least one processor in a computer of the system or apparatus reads and executes the program. Further, an embodiment can also be achieved by a circuit for implementing at least one function (e.g., an application specific integrated circuit (ASIC)).

The scope of the present invention is not limited to the configurations described in the exemplary embodiments and other configurations may be employed as long as the concept of the present invention is satisfied.

While the present invention has specifically been described based on the above-described exemplary embodiments, the present invention is not limited thereto but can be modified in diverse ways within the ambit of the appended claims.

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-110350, filed Jun. 1, 2016, which is hereby incorporated by reference herein in its entirety.

What is claimed is:

1. An imaging apparatus including an optical system for forming an object image, and configured to acquire the object image as image signals at a predetermined frame rate, the imaging apparatus comprising:
   an image sensor outputting a plurality of image signals with different exposures and a focus detection signal for performing a phase difference detection; and
   controller having a processor which executes instructions stored in a memory, the controller being configured to function as:
   a composition unit configured to compose the plurality of image signals with different exposures output from the imaging unit to output composed image signals,
   wherein, in outputting the plurality of image signals with different exposures at the predetermined frame rate, the image sensor outputs the focus detection signal as a substitute for a part of the plurality of image signals with different exposures at a predetermined timing, and wherein, in composing the plurality of image signals with different exposures, the composition unit uses the image signals acquired before the predetermined timing instead of a part of the image signals replaced at the predetermined timing.

2. The imaging apparatus according to claim 1, further comprising a storage that stores at least a part of the plurality of image signals with different exposures, wherein the composition unit composes the plurality of image signals by using the image signals acquired before the predetermined timing stored in the storage unit.

3. The imaging apparatus according to claim 1, wherein the image signals acquired before the predetermined timing are image signals included in a first frame time-sequentially adjacent to a second frame including the plurality of image signals with different exposures output at the predetermined timing.

4. The imaging apparatus according to claim 1, wherein the predetermined timing is determined based on at least any one of a frame rate, a resolution, and a control cycle for controlling the optical system.

5. The imaging apparatus according to claim 4, wherein, in a case where the image sensor outputs the plurality of image signals with different exposures at the frame rate lower than the predetermined frame rate, the image sensor outputs the focus detection signal for performing the phase difference detection in addition to the plurality of image signals with different exposures, without replacing the part of the plurality of image signals with different exposures.

6. The imaging apparatus according to claim 4, wherein the predetermined frame rate is 60 fps or higher.

7. The imaging apparatus according to claim 4, wherein the predetermined timing is lower than the predetermined frame rate at which the plurality of image signals with different exposures is output, and is a fixed cycle.

8. The imaging apparatus according to claim 1, wherein the predetermined timing is determined based on a moving amount of the object image.

9. The imaging apparatus according to claim 1, wherein the plurality of image signals with different exposures includes at least an image signal acquired with a proper exposure and an image signal acquired with an underexposure.

10. The imaging apparatus according to claim 9, wherein a part of the plurality of image signals with different exposures to be replaced by the focus detection signal include the image signal acquired with the underexposure.

11. The imaging apparatus according to claim 1, wherein the composition unit composes the plurality of image signals with different exposures and outputs an image signal having an expanded dynamic range.

12. The imaging apparatus according to claim 1, wherein the image sensor includes at least two photoelectric conversion units corresponding to one micro lens.

13. The imaging apparatus according to claim 1,
wherein the composition unit includes a composition ratio calculation unit configured to calculating a composition ratio for composing the plurality of image signals with different exposures, and wherein the composition ratio calculation unit calculates the composition ratio based on whether a part of the image signals is replaced.

14. The imaging apparatus according to claim 1, wherein the image sensor includes a stacked type image sensor.

15. A method for controlling an imaging apparatus including an optical system for forming an object image, and configured to acquire the object image as image signals at a predetermined frame rate, the method comprising:
outputting a plurality of image signals with different exposures and a focus detection signal for performing a phase difference detection;
outputting, when the plurality of image signals with different exposures is output at the predetermined frame rate, the focus detection signal as a substitute for a part of the plurality of image signals with different exposures at a predetermined timing; and
composing the plurality of image signals which includes the image signals acquired before the predetermined timing instead of a part of the image signals replaced at the predetermined timing, with different exposures.

16. An imaging apparatus for acquiring signals at a predetermined frame rate, comprising:
a controller having a processor which executes instructions stored in a memory, the controller being configured to function as:
an acquisition unit configured to acquire a plurality of image signals with different exposures and a focus detection signal for performing a focus detection of an optical system for forming an object image; and
a rate control circuit configured to control a frame rate,
wherein, in performing control to increase a first frame rate at which the plurality of image signals with different exposures is acquired by the acquisition unit, the rate control circuit differentiates an increase amount of a second frame rate at which the focus detection signal is acquired from an increase amount of the first frame rate.

17. The imaging apparatus according to claim 16, wherein the controller is further configured to function as: a composition unit configured to compose the plurality of image signals with different exposures and output image signals having an expanded dynamic range.

18. The imaging apparatus according to claim 17,
wherein the plurality of image signals with different exposures includes at least an image signal acquired with a proper exposure, and
wherein a third frame rate at which an image signal with a non-proper exposure included in the plurality of image signals with different exposures is acquired is lower than the first frame rate.

19. The imaging apparatus according to claim 18, further comprising an image processor that performs interpolation processing on the image signal with the non-proper exposure included in the plurality of image signals with different exposures, by using an image signal of an adjacent frame previously or subsequently read.

20. The imaging apparatus according to claim 16, further comprising an image sensor that includes at least two photoelectric conversion units corresponding to one micro lens.

* * * * *